United States Patent [19]
Rohowetz

[11] 3,898,945
[45] Aug. 12, 1975

[54] METHOD FOR MAKING A LAP SIDE SEAM ON A METAL TUBULAR BOBY

[75] Inventor: Stanley Edward Rohowetz, Barrington, Ill.

[73] Assignee: American Can Company, Greenwich, Conn.

[22] Filed: Feb. 15, 1974

[21] Appl. No.: 442,906

Related U.S. Application Data

[62] Division of Ser. No. 238,840, March 28, 1972, Pat. No. 3,819,085.

[52] U.S. Cl. ............... 113/120 A; 29/458; 156/218; 156/285; 156/331
[51] Int. Cl. ............................................. B65d 7/34
[58] Field of Search .......... 156/218, 497, 331, 285; 161/107, 214; 220/75, 81; 29/458; 113/120 A

[56] References Cited
UNITED STATES PATENTS

| | | | |
|---|---|---|---|
| 3,042,103 | 7/1962 | McDevitt et al. | 156/466 |
| 3,066,063 | 11/1962 | Ecklund et al. | 156/218 X |
| 3,225,954 | 12/1965 | Herrick et al. | 220/75 X |
| 3,278,358 | 10/1966 | Rosewicz et al. | 156/497 X |
| 3,288,664 | 11/1966 | Hoppe | 161/214 X |
| 3,437,063 | 4/1969 | Battersby | 220/75 X |
| 3,502,243 | 3/1970 | Erlandson et al. | 220/81 X |
| 3,550,806 | 12/1970 | Peerman et al. | 220/81 |
| 3,773,589 | 11/1973 | Kaiser et al. | 156/218 |

*Primary Examiner*—Harold Ansher
*Assistant Examiner*—Henry F. Epstein
*Attorney, Agent, or Firm*—Robert P. Auber; Ernestine C. Bartlett; George P. Ziehmer

[57] ABSTRACT

An adhesively bonded, lap side seam of a primed metal, tubular body having a raw metal edge on the inside lap is provided with a protective thermoplastic resin coating on the raw metal edge of the inside lap and a thermoplastic adhesive wrapped around the resin coating and the interior and exterior surfaces of the inside lap.

5 Claims, 2 Drawing Figures

PATENTED AUG 12 1975　　　　　　　　　　　　　　　　　　3,898,945

METHOD FOR MAKING A LAP SIDE SEAM ON A METAL TUBULAR BOBY

This is a divisional of application Ser. No. 238,840 filed Mar. 28, 1972, now U.S. Pat. No. 3,819,085 issued June 25, 1974.

BACKGROUND OF THE INVENTION

The present invention relates to primed metal, tubular bodies formed with an adhesively bonded, lap side seam, and more particularly is concerned with the construction of the inside lap of the lap side seam.

In the formation of a lap side seam in a metal, tubular body that has had a primer coating applied to the surfaces thereof, the inside and outside lap (i.e. the overlapped marginal portions) usually terminate in a raw, metal edge, due to prior shearing of the primed metal. The outer surfaces of the tubular body, including the raw edge of the outside lap, may be protected readily against various forms of chemical attack by applying some sort of protective coating.

However, it has been found to be exceedingly difficult to protect the raw, metal edge of the inside lap of the tubular body from chemical attack and corrosion owing to the contents contained within the tubular body. This is particularly true where the tubular body forms part of a container or can for beer or carbonated beverages. It has been found that where the raw metal edge is not covered with a resin coating which lies beneath the adhesive, that the contents eventually penetrate the adhesive and corrode the raw, metal edge, which may well lead to deterioration of the container as well as the contents therein.

The reason for much of the difficulty associated with the adhesively bonded, lap side seam is that the adhesive adheres to coated metal but not to raw metal, such as the edge of the inside lap. Thus, the instant invention utilizes a resin to form good adhesive bonds to the raw metal edge and in turn to the adhesive.

SUMMARY OF THE INVENTION

The present invention provides an improvement in an adhesively bonded, lap side seam of a primed metal, tubular body having a raw metal edge on the inside lap comprising a protective thermoplastic resin coating on the raw metal edge of the inside lap and a thermoplastic adhesive wrapped around the resin coating and the interior and exterior surfaces of the inside lap.

DESCRIPTION OF THE PREFERRED EMBODIMENT

Figure 1:
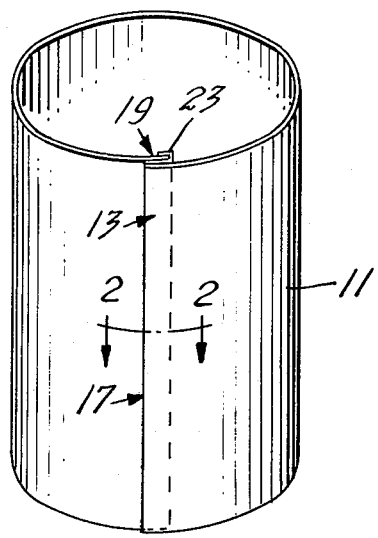
FIG. 1 is a perspective view of a tubular body with a lap side seam according to the present invention.

Reference is now made to the drawings in describing a preferred embodiment of the present invention. FIG. 1 illustrates a conventional metal can body 11 having an adhesively bonded, lap side seam 13 according to the present invention.

The side seam 13 is formed by first priming metal sheet with conventional inside coatings 14 and outside coatings 16 such as epoxy-phenolic systems. A varnish (not shown) is also applied on top of the outside coatings 16 but not in the area of the lap bond. The varnish is generally an acrylic system and is not critical to the instant invention.

The primed, metal sheet is then cut to the desired blank size, thereby leaving a raw metal edge 15 (see FIG. 2) along at least one marginal portion of the primed blank and most likely a second raw metal edge 17 in a second marginal portion. Of course, if the lap side seam 13 can be formed without a raw metal edge 15 on the inside lap 19, there is no need to employ the present invention. However, in forming cans today, there is virtually no way to avoid the raw metal edges 15 and 17 along the marginal portions of the body blank.

The raw edge 15 which is to be on the inside lap 19 is then run through a hot melt applicator which deposits a bead of a protective, thermoplastic resin 21 on the raw edge 15. The applicator is conventional, and may comprise a grooved wheel. It may be desirable to warm up the raw edge 15 before the hot melt resin 21 is applied in order to achieve a good bond between the edge 15 and the hot melt resin 21. Hot melt resins for this purpose are conventional polyamide polymers, and a preferred melt resin is General Mill's Versalon XR-1200 polyamide, a low molecular weight polyamide.

It is important that the protective resin 21 be applied to the raw metal edge 15 as a hot melt, rather than as a solution. The hot melt method deposits a uniform and protective amount of resin over the sharp, irregular metal edge 15. Solution coating the metal edge 15 would not provide the required uniformity and protection, and cannot assure the maintainance of the bead throughout fabrication of the body 11 which is necessary to insure against cracks and crevices developing in the protective resin 21.

The next step in forming the lap side seam 13 consists of applying a thermoplastic adhesive 23, preferably a nylon, around the protective resin 21 and the interior and exterior surfaces of the inside lap 19. The adhesive 23 may be extruded as a fluid ribbon around the resin 21 and the inside lap seam surfaces in conventional manner. One such method consists of extruding the adhesive 23 onto either the interior or exterior surface of the inside lap 19 with an overhang that is then forced around the resin 21 and onto the other surface of the lap 19 by rolling, blowing with a gas, or other means.

Figure 2:
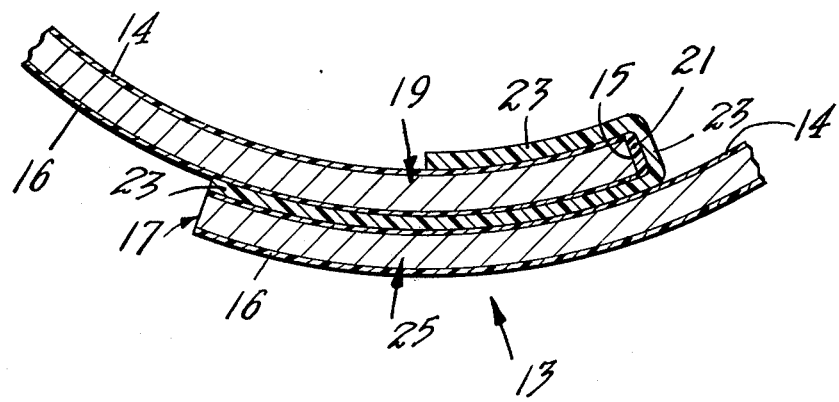
FIG. 2 is an enlarged, sectional view taken on the horizontal plane indicated by the line 2—2 of FIG. 1.

The adhesively wrapped blank is next fed to a conventional body maker, where the adhesive 23 is first heated, and then impact bonded to the outside lap 25. FIG. 2 is illustrative of the bonded structure thus formed. U.S. Pat. No. 3,066,063 provides alternative methods for applying the adhesive 23 and joining the inside lap 19 to the outside lap 25.

The particular protective resin 21 selected should adhere strongly to bare metal surfaces, possess low shrinkage on cooling for complete coverage of the raw edge 15, form strong bonds to the adhesive 23, have a melt temperature near that of the adhesive 23, and have a sufficiently high melt viscosity to remain in place during fabrication. Various fillers such as clays, talcs, silicas, etc., can be added to the protective resin 21 for embodying purposes.

The particular adhesive 23 selected should form strong shear and peel bonds to the metal primer coatings, have a high melt viscosity to permit impact bonding, and possess a sufficiently high melt temperature to allow subsequent coat bakes.

Since both the protective resin 21 and the adhesive 23 are thermoplastic, there is no need for any curing, thereby greatly simplifying the body fabricating process.

The adhesive 23 is applied along the interior surface of the inside lap 19 to the extent that it adheres to the inside coating 14 but not so that it interferes with the impact bonding step. As seen in FIG. 2 this is preferably about one-eighth to one-fourth the width of the side seam 13.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method of fabricating an adhesively bonded, lap side seam of a primed metal, tubular body having a protected raw metal edge on the inside lap comprising the steps of:
    applying a bead of a hot melt of a protective, thermoplastic polyamide resin on the raw metal edge of the inside lap; and
    wrapping a thermoplastic polyamide adhesive around the resin coating and the interior and exterior surfaces of the inside lap.

2. The method of claim 1 wherein the wrapping step comprises extruding the adhesive onto the exterior surface of the inside lap with an overhang, and forcing the overhang around the resin coating and onto the interior surface of the inside lap.

3. The method of claim 2 wherein the forcing step comprises blowing with a gas.

4. The method of claim 3 additionally comprising impact bonding the adhesively wrapped inside lap to the outside lap to form the lap side seam.

5. A method of fabricating an adhesively bonded, lap side seam of a primed metal tubular body having a protected raw metal edge on the inside lap comprising the steps of:
    providing metal sheet, both surfaces having applied thereto an epoxy-phenolic primer coating;
    forming said primed sheet into a tubular can body blank, said blank having a raw metal edge along at least one of its marginal portions;
    applying a protective thermoplastic polyamide resin in the form of a hot melt to at least the raw metal edge of the marginal portion of said primed body blank that is to form the inside lap;
    applying a thermoplastic polyamide adhesive in the form of a ribbon which wraps around the protective resin and the interior and exterior surfaces of the inside lap; and
    forming said body blank into a tubular can body, arranged to have a lap side seam wherein the primed interior metal surface within the seam is adjacent to and overlaps the primed opposed exterior surface within the seam and is bonded thereto by said thermoplastic adhesive.

* * * * *